(12) United States Patent
Nakanishi et al.

(10) Patent No.: US 6,352,794 B1
(45) Date of Patent: Mar. 5, 2002

(54) LITHIUM RECHARGEABLE BATTERY

(75) Inventors: Naoya Nakanishi, Tondabayashi; Kouichi Satoh, Itami; Kazuyasu Fujiwara, Sumoto; Toshiyuki Nohma; Ikuo Yonezu, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/472,615

(22) Filed: Dec. 27, 1999

(30) Foreign Application Priority Data

Dec. 25, 1998 (JP) .............................. 10-371278

(51) Int. Cl.$^7$ .............................. H01M 4/52; H01M 4/50
(52) U.S. Cl. ................. 429/221; 429/223; 429/224; 429/231.1
(58) Field of Search ................. 429/224, 221, 429/223, 231.1

(56) References Cited

U.S. PATENT DOCUMENTS 5,561,006 A   10/1996   Lecerf et al.
5,759,717 A * 6/1998   Amine et al.
5,789,112 A * 8/1998   Ellgen .................. 429/223
5,882,218 A   3/1999   Reimers
6,007,947 A * 12/1999  Mayer .................. 429/231.1
6,159,636 A * 12/2000  Wang et al. ............ 429/223

* cited by examiner

*Primary Examiner*—Carol Chaney
*Assistant Examiner*—Tracy Dove
(74) *Attorney, Agent, or Firm*—Merchant & Gould P.C.

(57) ABSTRACT

A lithium rechargeable battery having a superior battery performance in which manganese, being cheap and occurring in abundance, is used as an element of the positive electrode active material. The lithium rechargeable battery includes a negative electrode and a positive electrode, the negative electrode being made of a material capable or absorbing and releasing lithium, and the positive electrode being made of a lithium-containing metal oxide capable of absorbing and releasing lithium. The lithium-containing metal oxide is represented by a compositional formula $Li_xMN_{1-y-z}Ni_yFe_zO_2$, where $1 \leq x \leq 1.3$, $0.05 \leq y < 0.9$, $0.05 \leq z < 0.9$, $0.1 \leq y+z \leq 0.9$.

3 Claims, 1 Drawing Sheet

LITHIUM RECHARGEABLE BATTERY

BACKGROUND OF THE INVENTION

(1) Field of the Invention

The present invention relates to a lithium rechargeable battery. More particularly, the present invention relates to an improved active material for a positive electrode in lithium rechargeable batteries.

(2) Description of the Prior Art

Recently, attention has been given to nonaqueous batteries which use, as the negative electrode active material, an alloy or a carbon material capable of absorbing and releasing lithium, and use, as the positive electrode active material, a lithium transition metal composite oxide. This is because such nonaqueous batteries have high energy density.

The general lithium transition metal composite oxides are oxides which contain Li and one or more metal elements selected from Co, Ni, Fe, Mn, and Cu. The representative examples of such lithium transition metal composite oxides are $LiCoO_2$, $LiMnO_2$, and $LiFeO_2$.

Of the above lithium transition metal composite oxides, lithium cobalt oxide ($LiCoO_2$) is typical. Although it is expected that use of lithium manganese oxide ($LiMnO_2$) as the positive electrode active material will exceed that of lithium cobalt oxide since lithium manganese oxide includes manganese which is cheap and occurs in abundance.

Also, lithium transition metal composite oxides using manganese have higher thermal stability than those using cobalt. Accordingly, it is expected that a battery adopting a lithium transition metal composite oxide using manganese as the positive electrode active material will show superior storage characteristics in charging and superior thermal stability against overcharge.

However, use of a lithium manganese oxide as the positive electrode active material has a problem that charge/discharge characteristics, such as the discharge capacity, decrease noticeably as the number of charge/discharge cycles increases. It is generally considered that this deficiency is generated when the crystal structure of the lithium manganese oxide becomes unstable as the number of charge/discharge cycles increases.

More particularly, as the number of performed charge/discharge cycles increases, only manganese ions react and solve into the electrolyte solution, resulting in unstableness of the crystal structure of the lithium manganese oxide. This causes the absorbing and releasing ability of the lithium ions to decrease, resulting in reduction in the battery capacity.

SUMMARY OF THE INVENTION

It is therefore an object of the present invention to provide a lithium rechargeable battery having a superior battery performance, the lithium rechargeable battery using manganese, being cheap and occurring in abundance, as an element of the positive electrode active material.

The above object is achieved by a lithium rechargeable battery including a negative electrode and a positive electrode, the negative electrode being made of a material capable of absorbing and releasing lithium, and the positive electrode being made of a lithium-containing metal oxide capable of absorbing and releasing lithium, wherein the lithium-containing metal oxide is represented by a compositional formula $Li_xMn_{1-y-z}Ni_yFe_zO_2$, wherein $1 \leq x \leq 1.3$, $0.05 \leq y < 0.9$, $0.05 \leq z < 0.9$, $0.1 \leq y+z \leq 0.9$.

With the above composition, the positive electrode active material has stable crystal structure. The lithium rechargeable battery using this positive electrode active material has superior battery characteristics such as the cycle life characteristic and the storage characteristic. Another advantage in using this active material is that manganese, which is cheap and occurring in abundance, is used as an element of the active material.

Note that the composition of the lithium-containing metal oxide is analyzed using a known elementary analysis method, the inductively coupled plasma emission spectrometry.

In the above lithium rechargeable battery, when granular lithium-containing metal oxide is used, it is preferable that the average particle diameter of the lithium-containing metal oxide is in a range of 5 μm to 25 μm.

In the above lithium rechargeable battery, when granular lithium-containing metal oxide is used, it is preferable that the specific surface area on particles of the lithium-containing metal oxide is in a range of 0.1 $m^2/g$ to 5 $m^2/g$.

Note that the average particle diameter is measured using the laser forward scattering method, and that the specific area is measured using the BET adsorption method.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
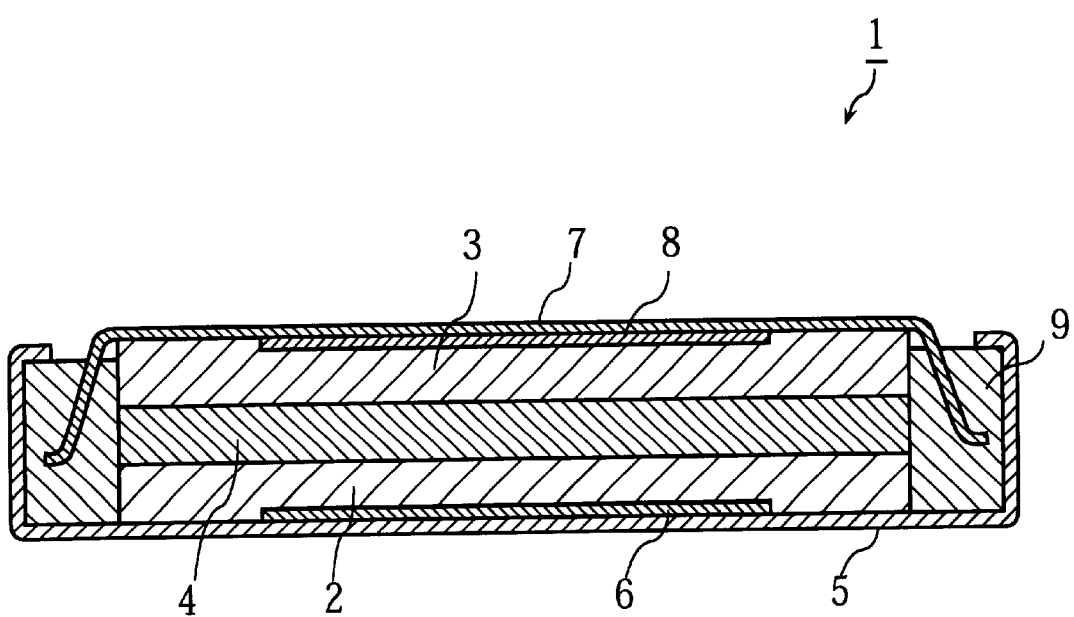
FIG. 1 is a sectional view showing the construction of the lithium rechargeable battery of the present embodiment.

The following are description of the present invention through a specific embodiment thereof by way of referring to the drawings.

FIG. 1 is a sectional view showing the construction of the lithium rechargeable battery 1 of the present embodiment.

The lithium rechargeable battery 1 has a button-like appearance and includes an electricity production element composed of a positive electrode 2, a negative electrode 3, and a separator 4 sandwiched between the positive electrode 2 and the negative electrode 3, where the positive electrode 2 is in contact with a current collector 6 disposed inside an exterior component 5 which is electrically conductive, the negative electrode 3 is in contact with a current collector 8 disposed inside an exterior component 7 which is electrically conductive, the exterior component 5 becomes a positive terminal, and the exterior component 7 becomes a negative terminal. As shown in the drawing, the exterior component 7 is fitted into the exterior component 5 by caulking, though a packing 9 made of a resin in the shape of a ring is inserted between the exterior components 5 and 7 to prevent them from short-circuiting.

The positive electrode 2 is formed by: pressurizing and hardening a mixture paste of a lithium-containing metal oxide represented by a compositional formula $Li_xMn_{1-y-z}Ni_yFe_zO_2$ (where $1 \leq x \leq 1.3$, $0.05 \leq y < 0.9$, $0.05 \leq z < 0.9$, $0.1 \leq y+z \leq 0.9$), a conductive agent such as acetylene black or ketjen black, and a binding agent such as a fluororesin like poly(vinylidene fluoride) or polytetrafluoroethylene; stamping out a disk from the hardened mixture; and heating the stamped disk at a certain temperature. Use of the lithium-containing metal oxide having the above composition provides a superior cycle life characteristic and a superior storage characteristic to a battery.

The negative electrode 3 is formed by stamping out a disk from a rolled lithium metal or a rolled lithium alloy.

The separator 4 is a fine porous film made of a resin such as polypropylene. The separator 4 is impregnated with a nonaqueous electrolyte solution.

The electrolyte solution is made by solving a solute into a solvent. The solvent is selected from the group consisting of ethylene carbonate, propylene carbonate, butylene carbonate, dimethyl carbonate, diethyl carbonate, methyl ethyl carbonate, sulfolane, 3-methyl sulfolane, 1,2-dimethoxy ethane, tetrahydrofuran, 2-methyl tetrahydrofuran, and 1,3-dioxolane, or may be a mixture of two or more substances selected from the group. The solute is selected from the group consisting of $LiPF_6$, $LiBF_4$, $LiCF_3SO_3$, $LiAsF_6$, $LiN(CF_3SO_2)_2$, $LiN(CF_3SO_2)(C_4F_9SO_2)$, $LIN(CF_9SO_2)_2$, or may be a mixture of two or more substances selected from the group.

Method of Producing Lithium-Containing Metal Oxide as Positive Electrode Active Material The lithium-containing metal oxide used for the positive electrode 2 is produced with the following procedure.

First, lithium hydroxide (LiOH), manganese oxide ($Mn_2O_3$), nickel hydroxide ($Ni(OH)_2$), and iron hydroxide ($Fe(OH)_3$) are mixed at a certain ratio. The mixture is then heated at a certain temperature (e.g., 750° C.) for a certain time period (e.g., 20 hours) in an atmosphere of dry air. The dried mixture is then ground using a grinder such as a jet mill until the particles have a certain diameter. The lithium-containing metal oxide to be used for the positive electrode 2 is obtained in this way.

The ratio of lithium hydroxide (LiOH), manganese oxide ($Mn_2O_3$), nickel hydroxide ($Ni(OH)_2$), and iron hydroxide ($Fe(OH)_3$) in the lithium-containing metal oxide is represented by $x:(1-y-z):y:z$ in molar ratio.

It is preferable that the average particle diameter of the finished lithium-containing metal oxide after the grinding of the mixture with a grinder is in a range of 5 $\mu$m to 25 $\mu$m. Also, it is preferable that the specific surface area is in a range of 0.1 $m^2/g$ to 5 $m^2/g$. These specifications will be described later.

The above grinding method may be replaced by another method in which the mixture is first roughly ground, then sieved through a certain mesh so that particles with a desired diameter are obtained.

EXAMPLES

The following are description of examples of the lithium rechargeable battery explained in the present embodiment.

Example 1

TABLE 1

| a | b | | | | | | | | | |
|---|---|---|---|---|---|---|---|---|---|---|
|   | c | d | e | f | g | h | i | j | k | l |
| A1 | 1 | 0.9 | 0.05 | 0.05 | 0.1 | 15 | 0.5 | 130 | 23 | 95 |
| A2 | 1 | 0.7 | 0.15 | 0.15 | 0.3 | 15 | 0.5 | 137 | 21 | 94 |
| A3 | 1 | 0.5 | 0.25 | 0.25 | 0.5 | 15 | 0.5 | 140 | 24 | 96 |
| A4 | 1 | 0.3 | 0.35 | 0.35 | 0.7 | 15 | 0.5 | 150 | 20 | 96 |
| A5 | 1 | 0.1 | 0.45 | 0.45 | 0.9 | 15 | 0.5 | 131 | 23 | 95 |
| A6 | 1.3 | 0.5 | 0.25 | 0.25 | 0.5 | 15 | 0.5 | 130 | 22 | 94 |
| A7 | 1 | 0.5 | 0.25 | 0.25 | 0.5 | 5 | 4.97 | 125 | 25 | 93 |
| A8 | 1 | 0.5 | 0.25 | 0.25 | 0.5 | 25 | 0.11 | 135 | 20 | 95 |
| A9 | 1 | 0.5 | 0.25 | 0.25 | 0.5 | 4 | 5.5 | 99 | 29 | 91 |
| A10 | 1 | 0.5 | 0.25 | 0.25 | 0.5 | 26 | 0.09 | 100 | 28 | 92 |
| R1 | 1 | 1 | 0 | 0 | 0 | 15 | 0.5 | 26 | 45 | 82 |

TABLE 1-continued

| a | b | | | | | | | | | |
|---|---|---|---|---|---|---|---|---|---|---|
|   | c | d | e | f | g | h | i | j | k | l |
| R2 | 1.4 | 0.5 | 0.25 | 0.25 | 0.5 | 15 | 0.5 | 95 | 30 | 88 |
| R3 | 1 | 0.5 | 0 | 0.5 | 0.5 | 15 | 0.5 | 85 | 34 | 83 |
| R4 | 1 | 0.5 | 0.5 | 0 | 0.5 | 15 | 0.5 | 92 | 31 | 87 |
| R5 | 1 | 0.06 | 0.47 | 0.47 | 0.94 | 15 | 0.5 | 98 | 30 | 88 |

In Table 1: a = battery, b = composition of positive electrode active material, c = Li, d = Mn(1 − y − z), e = Ni(y), f = Fe(z), g = y + z, h = average particle diameter ($\mu$m) of positive electrode active material, i = specific surface area ($m^2/g$) of positive electrode active material, j = cycle life (cycle), k = self-discharging capacity (%), l = restoration after storage (%), A1 to A10 = Examples, and R1 to R5 = Comparative Examples.

Production of Positive Electrode

A lithium-containing metal oxide was produced for battery A1 based on the composition formula introduced with values shown in Table 1. That is to say, the produced lithium-containing metal oxide has composition $LiMn_{0.9}Ni_{0.05}Fe_{0.05}O_2$, 15 $\mu$m of average particle diameter, and 0.5 $m^2/g$ of specific surface area. A paste was then produced by mixing the lithium-containing metal oxide (positive electrode active material), acetylene black, and poly(vinylidene fluoride) at the ratio of 90:6:4 by weight. A pressure of 2 $t/cm^2$ was then given to the mixture paste to form a disk being 20 mm in diameter. The disk was heated in a vacuum at 250° C. for two hours to complete the positive electrode.

Production of Negative Electrode

The negative electrode was formed by stamping out a 20 mm diameter disk from a rolled plate of a lithium-aluminum alloy.

Production of Electrolyte Solution

A nonaqueous electrolyte solution was produced by: mixing ethylene carbonate with diethyl carbonate at the ratio of 1:1 by volume to generate a mixture solvent; and solving $LiPF_6$ into the mixture solvent so that the resultant mixture is 1 mol/L in concentration.

The separator was made from a polypropylene film (with product name "Juragard").

In this way, Battery A1, or Example 1, having a button-like appearance was produced using the above-described positive electrode, negative electrode, etc.

The following examples, Batteries A2 to A10, are produced in the same way as Example 1 except the composition, average particle diameter, and specific surface area of lithium-containing metal oxide.

Example 2

Battery A2 was produced using, as the positive electrode active material, a lithium-containing metal oxide whose composition is represented as $LiMn_{0.7}Ni_{0.15}Fe_{0.15}O_2$.

Example 3

Battery A3 was produced using, as the positive electrode active material, a lithium-containing metal oxide whose composition is represented as $LiMn_{0.5}Ni_{0.25}Fe_{0.25}O_2$.

Example 4

Battery A4 was produced using, as the positive electrode active material, a lithium-containing metal oxide whose composition is represented as $LiMn_{0.3}Ni_{0.35}Fe_{0.35}O_2$.

Example 5

Battery A5 was produced using, as the positive electrode active material, a lithium-containing metal oxide whose composition is represented as $LiMn_{0.1}Ni_{0.45}Fe_{0.45}O_2$.

Example 6

Battery A6 was produced using, as the positive electrode active material, a lithium-containing metal oxide whose composition is represented as $Li_{1.3}Mn_{0.5}Ni_{0.25}Fe_{0.25}O_2$.

Example 7

Battery A7 was produced using, as the positive electrode active material, a lithium-containing metal oxide whose composition is represented as $LiMn_{0.5}Ni_{0.25}Fe_{0.25}O_2$.

Also, to study the effect of the difference in the particle diameter of the positive electrode active material, the average particle diameter of the lithium-containing metal oxide was set to 5 μm.

Example 8

Battery A8 was produced using, as the positive electrode active material, a lithium-containing metal oxide whose composition is represented as $LiMn_{0.5}Ni_{0.25}Fe_{0.25}O_2$.

Also, to study the effect of the difference in the particle diameter of the positive electrode active material, the average particle diameter of the lithium-containing metal oxide was set to 25 μm.

Example 9

To study the effect of the difference in the particle diameter of the positive electrode active material in comparison with Example 3, the average particle diameter of the lithium-containing metal oxide was set to 4 μm.

Example 10

To study the effect of the difference in the particle diameter of the positive electrode active material in comparison with Example 3, the average particle diameter of the lithium-containing metal oxide was set to 26 μm.

The following comparative examples, Batteries R1 to R5, are produced in the same way as Example 1 except the composition, average particle diameter, and specific surface area of lithium-containing metal oxide.

Comparative Example 1

Battery R1 was produced using, as the positive electrode active material, a lithium-containing metal oxide whose composition is represented as $LiMnO_2$.

Comparative Example 2

Battery R2 was produced using, as the positive electrode active material, a lithium-containing metal oxide whose composition is represented as $Li_{1.4}Mn_{0.5}Ni_{0.25}Fe_{0.25}O_2$.

Comparative Example 3

Battery R3 was produced using, as the positive electrode active material, a lithium-containing metal oxide whose composition is represented as $LiMn_{0.5}Fe_{0.5}O_2$.

Comparative Example 4

Battery R4 was produced using, as the positive electrode active material, a lithium-containing metal oxide whose composition is represented as $LiMn_{0.5}Ni_{0.5}O_2$.

Comparative Example 5

Battery R5 was produced using, as the positive electrode active material, a lithium-containing metal oxide whose composition is represented as $LiMn_{0.06}Ni_{0.47}Fe_{0.47}O_2$.

<Experiment>

The experiment described below was performed on each of the above Examples and Comparative Examples to obtain the characteristics of each battery.

Charge/Discharge Cycle Characteristic (Cycle Life Characteristic)

Each battery was subjected to repeated cycles of a charge/discharge. Each charge in the cycle was performed with 0.2 C of charging current and 4.3V of charging final voltage; each discharge in the cycle was performed with 0.2 C of discharging current and 2.75V of discharging final voltage. The cycle life of a battery is the number of charge/discharge cycles having been performed at the time the discharging capacity falls short of 90% of the initial capacity (including the current cycle). The results of the experiment are shown in Table 1 above.

Storage Characteristic

Each battery was charged with 0.2 C of charging current and 4.3V of charging final voltage, let stand at 25° C. for 30 days, then discharged with 0.2 C of discharging current and 2.75V of discharging final voltage. The self-discharging capacity (%) was calculated based on Formula 1 below using the pre-storage and the post-storage discharging capacities. This test is referred to as shelf test.

Formula 1

Self-discharging capacity (%)={(pre-storage discharging capacity–post-storage discharging capacity)/(pre-storage discharging capacity)}×100

Each battery was then charged with 0.2 C of charging current and 4.3V of charging final voltage, and discharged with 0.2 C of discharging current and 2.75V of discharging final voltage. The discharging capacity measured at this time is referred to as post-shelf-test discharging capacity. The restoration after storage (%) was calculated based on Formula 2 below using the battery capacity before the shelf test and the post-shelf-test discharging capacity.

Formula 2

Restoration after storage (%)={(discharging capacity at fully charged condition after shelf test)/(pre-storage discharging capacity)}×100

These results are also shown in Table 1 above.

<Experiment Results and Consideration>

As apparent from a comparison between each experiment result for Batteries A1 to A10 and Comparative Batteries R1 to R5, the batteries using lithium-containing metal oxides (positive electrode active materials) represented by the compositional formula $Li_xMn_{1-y-z}Ni_yFe_zO_2$ and satisfying the conditions $1 \leq x \leq 1.3$, $0.05 \leq y < 0.9$, $0.05 \leq z < 0.9$, $0.1 \leq y+z \leq 0.9$ are superior in the cycle life and the storage characteristic.

This is thought to be because the crystal structure of the lithium-containing metal oxides (positive electrode active materials) represented by the compositional formula $Li_xMn_{1-y-z}Ni_yFe_zO_2$ and satisfying the conditions $1 \leq x \leq 1.3$, $0.05 \leq y < 0.9$, $0.05 \leq z < 0.9$, $0.1 \leq y+z \leq 0.9$ is more stable than those not satisfying the compositional formula, preventing manganese ions in the crystal from solving into the electrolyte solution.

Each Comparative Battery satisfies one of the conditions $1 \leq x \leq 1.3$, $0.05 \leq y < 0.9$, $0.05 \leq z < 0.9$, and $0.1 \leq y+z \leq 0.9$, but does not satisfy all of them. This shows that to obtain the superior battery performance, all of these conditions should be satisfied.

Although the lithium-containing metal oxide (positive electrode active material) of Battery A9 is represented by the same compositional formula as Batteries A3 and A7, Battery A9 has slightly lower characteristics than Batteries A3 and A7. The reason for this is thought as follows. The average particle diameter of the positive electrode active material of Battery 9 is as small as 4 μm. This increases the specific surface area to 5.5 m²/g and facilitates the solving of manganese ions from the crystal of the lithium-containing metal oxide into the electrolyte solution, resulting in a slight unstableness of the crystal structure of the lithium-containing metal oxide (positive electrode active material).

Although the lithium-containing metal oxide (positive electrode active material) of Battery A10 is represented by the same compositional formula as Batteries A3 and A7, Battery A10 has slightly lower characteristics than Batteries A3 and A7. The reason for this is thought as follows. The average particle diameter of the positive electrode active material of Battery 10 is as large as 26 μm. This reduces the specific surface area to 0.09 m²/g and reduces the solving of manganese ions from the crystal of the lithium-containing metal oxide into the electrolyte solution, contributing to a more stable crystal structure of the lithium-containing metal oxide. On the other hand, however, this slightly reduces the effective response area of the particles of the active material on which the active material is in contact with the electrolyte solution. This tends to cause the battery capacity to be reduced.

The above observation shows that the preferable average particle diameter of the lithium-containing metal oxide as the positive electrode active material is in the range of 5 μm to 25 μm.

The specific surface area is substantially determined by the particle diameter. Thus, the above condition can also be described as follows: the preferable specific surface area of the positive electrode active material is in the range of 0.1 m²/g to 5 m²/g.

The batteries in the above Embodiment and Examples have a button-like appearance. However, the batteries may be cylindrical or prismatic, where the cylindrical batteries are formed by coiling a set of a positive electrode and a negative electrode with a separator in between.

In the above Embodiment and Examples, the negative electrode is made of an alloy capable of absorbing and releasing lithium. However, the negative electrode may be made of a carbon material capable of absorbing and releasing lithium ions.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lithium rechargeable battery including a negative electrode and a positive electrode, the negative electrode being made of a material capable of absorbing and releasing lithium, and the positive electrode being made of a lithium-containing metal oxide capable of absorbing and releasing lithium, wherein the lithium-containing metal oxide is represented by a compositional formula $Li_xMn_{1-y-z}Ni_yFe_zO_2$, wherein $1 \leq x \leq 1.3$, $0.05 \leq y < 0.9$, $0.05 \leq z < 0.9$, $0.1 \leq y+z \leq 0.9$.

2. The lithium rechargeable battery of claim 1, wherein the lithium-containing metal oxide is granular, and average particle diameter of the lithium-containing metal oxide is in a range of 5 μm to 25 μm.

3. The lithium rechargeable battery of claim 1, wherein the lithium-containing metal oxide is granular, and specific surface area of particles of the lithium-containing metal oxide is in a range of 0.1 m²/g to 5 m²/g.

* * * * *